United States Patent [19]

Moser

[11] 4,346,839
[45] Aug. 31, 1982

[54] SYSTEM FOR HEATING THE SERVICE CABIN OF A MOTOR VEHICLE

[75] Inventor: Gottfried Moser, Gladbach, Fed. Rep. of Germany

[73] Assignee: Klockner-Humboldt-Deutz AG, Cologne, Fed. Rep. of Germany

[21] Appl. No.: 123,944

[22] Filed: Feb. 25, 1980

[30] Foreign Application Priority Data

Jul. 18, 1979 [DE] Fed. Rep. of Germany ....... 2928999

[51] Int. Cl.³ .............................................. B60H 1/02
[52] U.S. Cl. .................................. 237/12.3 R; 122/26; 126/247
[58] Field of Search .......................... 237/1 R, 12.3 A; 126/247; 122/26; 165/35; 60/456

[56] References Cited

U.S. PATENT DOCUMENTS

| | | | |
|---|---|---|---|
| 2,097,857 | 11/1937 | Ferris et al. | 237/1 R |
| 3,333,771 | 8/1967 | Graham | 122/26 |
| 4,069,972 | 1/1978 | Hausmann | 237/12.3 R |
| 4,114,809 | 9/1978 | Sampson | 122/26 |
| 4,192,456 | 3/1980 | Shields | 122/26 |

Primary Examiner—Albert J. Makay
Assistant Examiner—Henry Bennett
Attorney, Agent, or Firm—Watson, Cole, Grindle & Watson

[57] ABSTRACT

An arrangement for heating the service cabin of a motor vehicle having a work implement thereon for use such as in agriculture or earth moving includes an oil distribution system having a hydraulic pump for feeding the oil from an oil reservoir associated with the vehicle and through oil conduits back to the reservoir. The oil is heated during operation of a hydraulic apparatus provided for operating the work implement which is coupled into the oil conduit for heating the service cabin area. An operating element in the form of a throttle is coupled in parallel into the oil conduits, and a return conduit leads from the throttle to the oil reservoir via the heat exchanger. A selectively operated valve in the conduits is provided for valving the oil from the reservoir to the hydraulic apparatus or to the operating element for selectively heating the oil fed through the heat exchanger.

2 Claims, 2 Drawing Figures

4,346,839

SYSTEM FOR HEATING THE SERVICE CABIN OF A MOTOR VEHICLE

RELATED APPLICATIONS

This application relates to U.S. Ser. No. 123,169, filed Feb. 20, 1980 and to U.S. Ser. No. 165,083 filed 7/1/80, both commonly owned herewith.

BACKGROUND OF THE INVENTION

This invention relates to an arrangement wherein the heat produced in the pressurized fluid while operating a hydraulic apparatus associated with the motor vehicle, especially a motor vehicle for use such as in agriculture or earth moving, is utilized for heating the service cabin of the motor vehicle through a heat exchanger.

German Offenlegungsshrift No. 25 39 565 discloses a motor vehicle which is hydraulically steered and which has a work implement articulated to the vehicle which contains a driver's (service) cabin. The principle elements of a hydraulic apparatus, provided for operating the work implement, are located on the vehicle so that the heat produced in the pressurized fluid during the operation of such apparatus can be utilized to heat the driver's cabin. This is effected by feeding the pressurized fluid, which is heated during operation of the hydraulic apparatus and the hydraulic steering gear, through a heat exchanger when required for heating the service cabin. However, when the hydraulic apparatus is not in operation, as when the motor vehicle is traveling along a highway, only the pressurized fluid heated during operation of the hydraulic steering gear is available for heating the service cabin. This moderate amount of heated pressurized fluid may, therefore, be insufficient for adequately heating the driver's cabin especially during severely cold outdoor temperatures.

SUMMARY OF THE INVENTION

It is therefore an object of the present invention to provide a heating arrangement of the type characterized above in such a manner that the driver's cabin may be adequately heated by the heated pressurized lubricating fluid even when the hydraulic apparatus is not in operation.

In accordance with the invention, an operating element in the form of a throttle is coupled in parallel into the oil conduits of the oil distribution system in such a manner as to by-pass the hydraulic apparatus, and means is provided for valving the pressurized fluid selectively through the throttle or through the hydraulic apparatus, so that the driver's cabin can be adequately heated via the heat exchanger even when the hydraulic apparatus is not in operation. Such a valving means may comprise a manually operated two-way valve.

Two heat exchangers may alternatively be provided and may be respectively associated with the hydraulic apparatus and with the throttle, or a single heat exchanger may be used through which the heated pressurized fluid is fed from both the throttle and the operating element. And, if the motor vehicle is equipped with a hydraulic servo steering gear, such a gear is arranged to have a return conduit in common with the hydraulic apparatus return for feeding the pressurized heated fluid into the heat exchanger.

Another feature according to the invention may include a thermostatically controlled valve provided in a by-pass line for regulating the volume of the heated oil to thereby regulate the temperature of the heat exchanger.

Other objects, advantages and novel features of the invention will become more apparent from the following detailed description of the invention when taken in conjunction with the accompanying drawings.

DETAILED DESCRIPTION OF THE INVENTION

Figure 1:
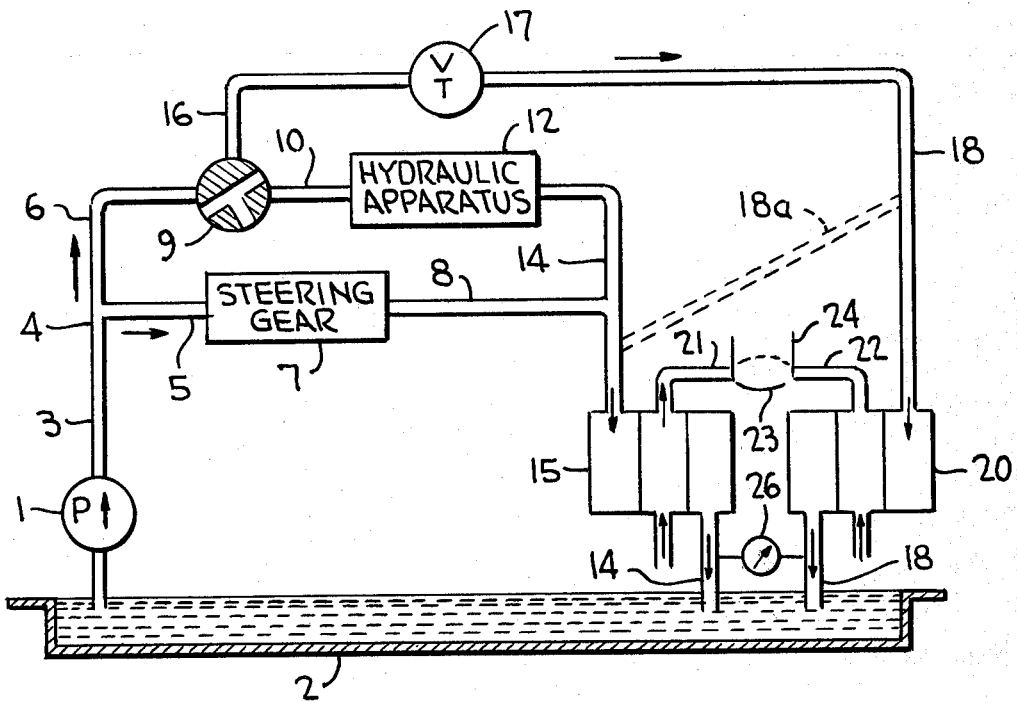
FIG. 1 diagramatically illustrates the heating arrangement according to the invention.

Turning now to the drawings wherein like reference characters refer to like and corresponding parts throughout the several views, the heating arrangement shown in FIG. 1 includes an oil distribution system which includes a hydraulic pump 1 provided for suctioning oil from a lubricating oil reservoir 2 or from a similar oil supply of the motor vehicle (not shown) with which the present arrangement is associated. The oil conduits of the distribution system include a feed line 3 and a T-junction 4 at which the oil is divided into branch lines 5 and 6. A hydraulic servo steering gear 7 is operatively coupled into branch line 5, the gear having an outlet conduit 8 provided at the exit end thereof in any normal manner. The junction or divider 4 is so designed as to insure the branching of a predetermined amount of pressurized fluid to the steering gear greater than that permitted to be branched through line 6. A manually operated two-way valve 9 is coupled into branch line 10 into the working element of a hydraulic apparatus 12 which is associated with the vehicle for operating the work implement provided on the vehicle for use such as in agricultural and earth moving. The hydraulic apparatus has control elements for activating the hydraulic elements thereof, not shown in any detail. A return conduit 14 leads away from the hydraulic apparatus and is connected with conduit 8 for conducting the pressurized fluid from the steering gear and from the hydraulic apparatus back to the oil reservoir via a heat exchanger 15.

A conduit 16 branching from two-way valve 9 is coupled to an operating element 17 in the form of a throttle valve having an outflow conduit 18 which leads back to the oil reservoir through a heat exchanger 20. The air outlets from heat exchangers 15 and 20 are interconnected by conduits 21 and 22 with a common exhaust 24 for directing heated air to the interior of the service cabin (not shown). A control and distribution element 23 is suitably provided for regulating the exhausted heated air. The heat exchangers may be each equipped with a single-stage or a multiple-stage blower (not shown) for transporting the heated air to exhaust 24. And, a temperature indicator or thermostat 26 may be operatively connected to the discharge lines from the heat exchangers for controlling the temperature of the pressurized fluid. Such an indicator may be equipped with an acoustic warning device.

When hydraulic apparatus 12 is in operation, two-way valve 9 is manually adjusted for conducting the pressurized oil to the hydraulic apparatus through conduits 6 and 10 as fed thereto by hydraulic pump 1. The pressurized fluid is likewise fed via junction 4 to conduit 5 and into the steering gear, and the fluid which is heated by operation of the hydraulic apparatus together with that by operation of servo steering gear 7, flows through return conduit 14 and through heat exchanger 15 back into oil reservoir 2. The heat is thus transferred in the heat exchanger to the air which is conveyed therethrough, and the heated fluid serves to heat the service cabin, when needed. On the other hand, when the hydraulic apparatus is not in operation, no heated pressurized fluid flows therefrom, so that only the heated pressurized fluid flowing from the steering gear through conduit 8 is returned via conduit 14 to the oil reservoir through heat exchanger 15. However, since the pressurized fluid flowing from the servo steering gear is typically only moderately heated, it might not suffice to supply the service cabin with sufficient heated air through heat exchanger 15, especially at low outdoor temperatures. Therefore when the hydraulic apparatus is not in operation, two-way valve 9 is manipulated to direct the flow from conduit 6 through conduit 16 and into operating element 17. The pressurized fluid flows through the throttle and returns via conduit 18 into the oil reservoir through heat exchanger 20. The pressurized fluid is heated so intensely by operating element 17, where the throttled cross-section is appropriately dimensioned, that heated air in an amount sufficient to adequately heat the service cabin can be transferred to heat exchanger 20. Of course, operating element 17 can be made adjustable so that it will conform to the operational characteristics of the elements of the heating arrangement. And, an alternate conduit 18a shown in dashed outline may be provided for interconnecting conduits 18 and 14 so that only a single heat exchanger 15 is required for the heating arrangement.

Figure 2:
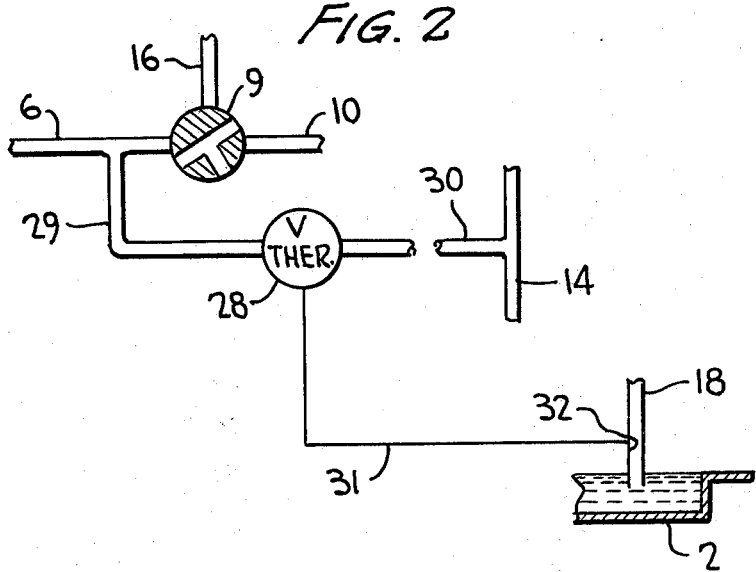
FIG. 2 is a partial diagramatic illustration of the FIG. 1 arrangement and further showing the thermostatically controlled by-pass line.

As shown in FIG. 2, the FIG. 1 heating arrangement can be modified by the provision of a thermostatically controlled valve 28 coupled into a by-pass line 29 for the purpose of by-passing two-way valve 9. Conduit 30 leading from valve 28 is connected with return conduit 14, and valve 28 is regulated by a thermostat 32 installed in conduit 18, the thermostat being interconnected with valve 28 by a line 31. Thus, when the maximum permissible temperature of the pressurized fluid being conveyed through conduit 18 is reached, for example by switching off or omitting heat exchanger 20, a corresponding volume of pressurized fluid may be carried off directly into conduit 14 from conduit 6 through conduit 29, valve 28 and through conduit 30. Thus, even during operation of throttle 17, provision is made for the undue heating of heat exchanger 20 or of the oil in the reservoir by the heated pressurized oil flowing from the throttle. The thermostatically controlled valve thus regulates the volume of the heated oil to thereby regulate the temperature of the heat exchangers.

Obviously, many modifications and variations of the present invention are made possible in the light of the above teachings. It is therefore to be understood that within the scope of the appended claims, the invention may be practiced otherwise than as specifically described.

What is claimed is:

1. A system for heating the service cabin of a motor vehicle having a work implement thereon for use such as in agriculture or earth moving, comprising a hydraulic pump for feeding oil under pressure from an oil reservoir associated with the vehicle and through an oil conduit system back to the reservoir, a hydraulic apparatus provided for operating the work implement being coupled into the oil conduit system for heating the oil passing therethrough, a throttling element having a fixed throttled cross-section coupled into the oil conduit system in parallel to said hydraulic apparatus for heating the oil passing therethrough, manually operable valve means in the oil conduit system upstream of said hydraulic apparatus and said throttling element for selectively valving the oil to said hydraulic apparatus and/or to said throttling element, a heat exchanger coupled into the oil conduit system downstream of said hydraulic apparatus and said throttling element for heating the service cabin area, said heat exchanger having an oil return line downstream thereof extending into the reservoir, the oil conduit system having a line by-passing said valve means and being connected upstream of said heat exchanger, a thermostatic valve in said by-pass line, and a thermostat operatively connecting said thermostatic valve and said return line from said heat exchanger for heat sensing the oil from said heat exchanger before reaching said oil reservoir, whereby the flow of oil may be selectively directed by operation of said manually operable valve means through said throttling element and/or through said hydraulic apparatus or only through said by-pass line depending on the temperature sensed by said thermostat for thereby regulating the temperature of said heat exchanger.

2. The heating system according to claim 1, wherein an oil pipe section is provided in said oil conduit system for dividing the flow as fed by the hydraulic pump directly to said heat exchanger while by-passing said hydraulic apparatus and said operating implement, a hydraulic servo steering gear associated with the vehicle being coupled into said oil pipe section so that during operation of said gear, the oil flowing through said pipe section is likewise heated.

* * * * *